(12) United States Patent
Chen et al.

(10) Patent No.: US 9,911,549 B2
(45) Date of Patent: Mar. 6, 2018

(54) KEY STRUCTURE AND PORTABLE COMPUTER USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chun-Lin Chen, Taipei (TW); Hsin-Fu Liu, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 15/232,272

(22) Filed: Aug. 9, 2016

(65) Prior Publication Data

US 2016/0351349 A1 Dec. 1, 2016

Related U.S. Application Data

(63) Continuation-in-part of application No. 15/049,001, filed on Feb. 19, 2016.

(Continued)

(30) Foreign Application Priority Data

Oct. 15, 2015 (TW) .............................. 104133859 A
May 9, 2016 (CN) .......................... 2016 1 0304086

(51) Int. Cl.
*H01H 3/12* (2006.01)
*G06F 1/16* (2006.01)
*H01H 13/84* (2006.01)

(52) U.S. Cl.
CPC ........... *H01H 3/122* (2013.01); *G06F 1/1616* (2013.01); *G06F 1/1662* (2013.01);
(Continued)

(58) Field of Classification Search
CPC ........ H01H 3/125; H01H 13/52; H01H 3/122; G06F 1/1616; G06F 1/1662
(Continued)

(56) References Cited

U.S. PATENT DOCUMENTS 4,977,298 A 12/1990 Fujiyama
5,382,762 A * 1/1995 Mochizuki ............. H01H 3/125
200/344

(Continued)

FOREIGN PATENT DOCUMENTS

CN 1145687 A 3/1997
CN 2793899 Y 7/2006
(Continued)

OTHER PUBLICATIONS

U.S. Office Action dated Jun. 23, 2017 corresponding to U.S. Appl. No. 15/618,602.
(Continued)

*Primary Examiner* — Edwin A. Leon
*Assistant Examiner* — Iman Malakooti
(74) *Attorney, Agent, or Firm* — Rabin & Berdo, P.C.

(57) ABSTRACT

A key structure includes a supporting board, a base board, a pre-stressing force applying assembly, a key cap, a pivot assembly, an attractable element and a magnetic element. The pre-stressing force applying assembly is connected to the supporting board or the base board. When the magnetic element is under the first attractive position, the first end of the attractable element is attracted by the magnetic force and moved to the first attractive position, and the pre-stressing force applying assembly generates a first pre-stressing force;

(Continued)

when the magnetic element is under the second attractive position, the second end of the attractable element is attracted by the magnetic force and moved to the second attractive position, and the pre-stressing force applying assembly generates a second pre-stressing force. The first pre-stressing force or the second pre-stressing force reduces the resistance during the sliding of the base board or the supporting board.

19 Claims, 13 Drawing Sheets

Related U.S. Application Data

(60) Provisional application No. 62/158,526, filed on May 7, 2015.

(52) U.S. Cl.
CPC ........... *G06F 1/1681* (2013.01); *H01H 3/125* (2013.01); *H01H 13/84* (2013.01); *H01H 2221/04* (2013.01); *H01H 2221/048* (2013.01); *H01H 2225/01* (2013.01)

(58) Field of Classification Search
USPC .......................................... 200/5 A, 341, 344
See application file for complete search history.

(56) References Cited

U.S. PATENT DOCUMENTS

| | | | | |
|---|---|---|---|---|
| 5,977,888 | A | 11/1999 | Fujita et al. | |
| 6,172,868 | B1* | 1/2001 | Oura | G06F 1/1616 200/344 |
| 7,022,927 | B2* | 4/2006 | Hsu | G06F 1/1615 200/344 |
| 7,417,200 | B2* | 8/2008 | Hsu | H01H 3/125 200/344 |
| 7,449,651 | B2 | 11/2008 | Lin | |
| 2009/0283393 | A1 | 11/2009 | Chen et al. | |
| 2014/0231234 | A1* | 8/2014 | Hsu | H01H 13/52 200/5 A |
| 2015/0101916 | A1 | 4/2015 | Chen | |
| 2015/0101917 | A1* | 4/2015 | Yen | H01H 13/84 200/5 A |

FOREIGN PATENT DOCUMENTS

| | | |
|---|---|---|
| CN | 103681065 A | 3/2014 |
| TW | 201434064 A | 9/2014 |
| TW | 201515040 A | 4/2015 |

OTHER PUBLICATIONS

Taiwanese Office Action dated May 4, 2017.
Chinese Office Action dated Sep. 29, 2017.

\* cited by examiner

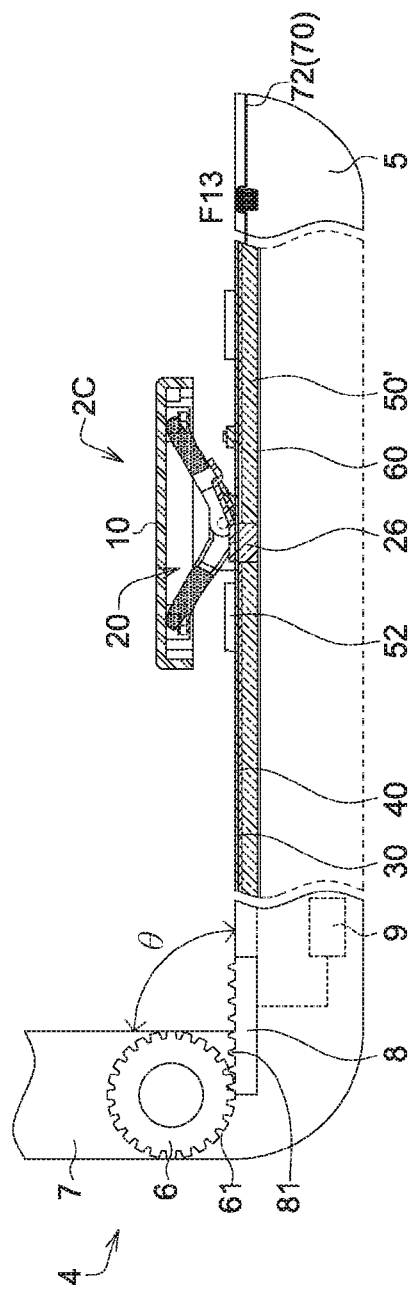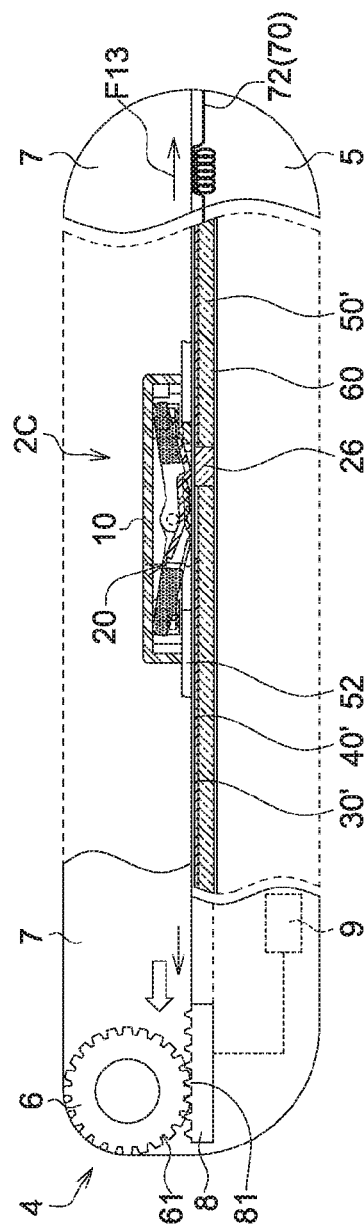
FIG. 12A
FIG. 12B

KEY STRUCTURE AND PORTABLE COMPUTER USING THE SAME

This application is a continuation-in-part application of co-pending U.S. application Ser. No. 15/049,001, filed Feb. 19, 2016, which claims the benefits of U.S. provisional application Ser. No. 62/158,526, filed May 7, 2015, and Taiwan application Serial No. 104133859, filed Oct. 15, 2015, and claims the benefit of CN application Serial No. 201610304086.6, filed May 9, 2016, the subject matters of which are incorporated herein by references.

BACKGROUND OF THE INVENTION

Field of the Invention

The invention relates in general to a key structure, and more particularly to a lift key structure and portable computer using the same.

Description of the Related Art

In a conventional key structure, an elastic member provides a recovery elastic force for a key cap supported by a scissor structure to restore the key cap to its pre-pressing position. However, the scissor structure, being hard to assemble and having a longer pressing stroke, is not suitable to the keyboard with thinning design. Meanwhile, when the key cap is pressed, the downward force is transmitted to a thin film circuit board formed of bi-layer circuits by the elastic member. However, if the downward force is insufficient, it is difficult to make the bi-layer circuits come into contact, and the sensitivity will be poor. Besides, the key structure cannot be stored to reduce the structural height when the key structure is not in use. Under the current trend of ultra-thinning design of the portable computer, there is a strong need to develop a new key structure whose overall height is reduced when the portable computer is closed.

SUMMARY OF THE INVENTION

The invention is directed to a lift key structure and a portable computer using the same capable of reducing the resistance during the movement of the supporting part or the base board so that the keys can be stored more conveniently.

According to one embodiment of the present invention, a key structure is provided. The key structure includes a supporting board, a base board, a pre-stressing force applying assembly, a key cap, a pivot assembly, an attractable element and a magnetic element. The base board and the supporting board are disposed adjacently, and one of the base board and the supporting board is a sliding board, so that the base board and the supporting board can slide with respect to each other. The pre-stressing force applying assembly is connected to the supporting board or the base board. The pivot assembly is interposed between the key cap and the supporting board. The attractable element is disposed under the pivot assembly, and has a first end and a second end, which are rotated around an axis and alternatively moved to a first attractive position and a second attractive position. The magnetic element provides a magnetic force and is movable between the first attractive position and the second attractive position through the sliding of the base board or the supporting board. When the magnetic element is under the first attractive position, the first end of the attractable element is attracted by the magnetic force and moved to the first attractive position, and the pre-stressing force applying assembly generates a first pre-stressing force; when the magnetic element is under the second attractive position, the second end of the attractable element is attracted by the magnetic force and moved to the second attractive position, and the pre-stressing force applying assembly generates a second pre-stressing force. The first pre-stressing force or the second pre-stressing force reduces the resistance during the sliding of the base board or the supporting board.

According to another embodiment of the present invention, a portable computer including an upper cover, a lower cover and a connecting part is provided. The upper cover and the lower cover are connected to the connecting part. The connecting part drives the base board or the supporting board of the key structure to slide. The above mentioned first pre-stressing force or the above mentioned second pre-stressing force reduces the resistance during the sliding of the base board or the supporting board driven by the connecting part.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 4-1 and 4-2 are schematic diagrams of key structures after assembly according to an embodiment of the invention.

FIGS. 9, 10-1 and 10-2 are decomposition diagrams of key structures before assembly and after assembly respectively according to an embodiment of the invention.

FIGS. 12A and 12B are cross-sectional views of key structures of the invention disposed in a portable computer and changed to a storing status (when the upper cover and the body of the portable computer are closed) from a releasing status (that is, a serviceable status, when the upper cover of the portable computer is opened).

DETAILED DESCRIPTION OF THE INVENTION

A number of embodiments are disclosed below for elaborating the invention. However, the embodiments of the invention are for detailed descriptions only, not for limiting the scope of protection of the invention.

Figure 1:
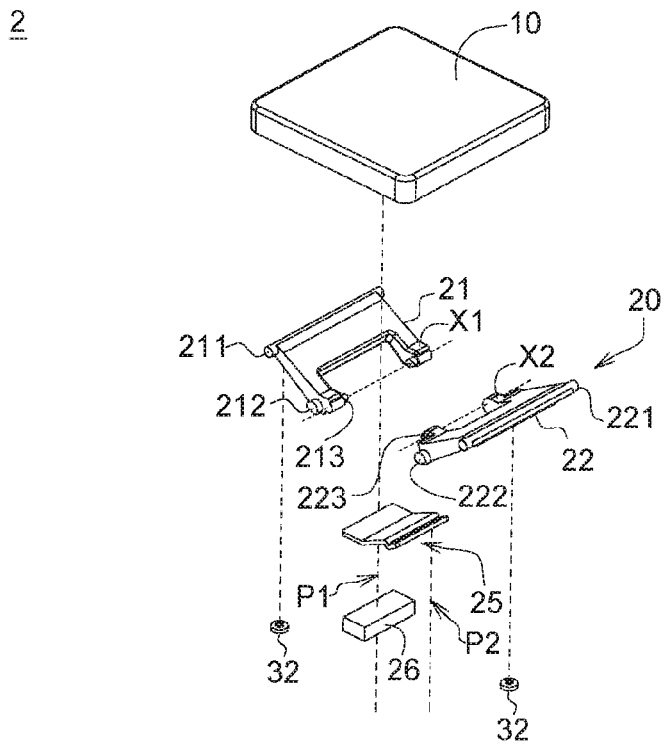
FIGS. 1-2 respective are a top-view decomposition diagram and a bottom-view decomposition diagram of a key structure according to an embodiment of the invention.
Figure 2:
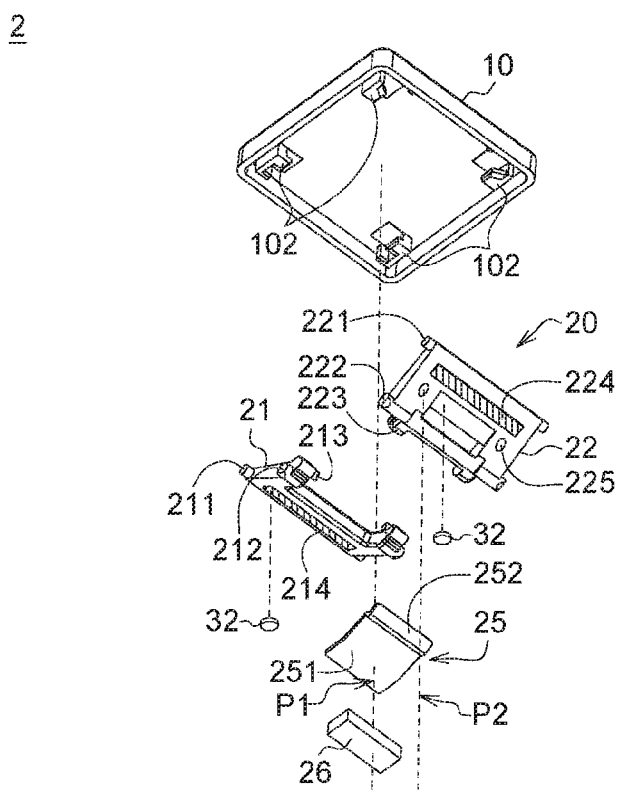

FIGS. 1-2 respective are a top-view decomposition diagram and a bottom-view decomposition diagram of a key structure 2 according to an embodiment of the invention. Refer to FIG. 1. The key structure 2 includes a key cap 10 and a bridge assembly 20. The bridge assembly 20 is disposed under the key cap 10. The bridge assembly 20 includes a first hinge part 21 and a second hinge part 22 intersecting to form a V-shaped structure. One end of the first hinge part 21 has a first link bar 211, and the other end of the first hinge part 21 has a first pivot coupling portion 212 and a first shaft X1. One end of the second hinge part 22 has a second link bar 221, and the other end of the second hinge part 22 has a second pivot coupling portion 222 and a second shaft X2. Additionally, the first shaft X1 of the first hinge part 21 has a first connecting portion 213, and the second shaft X2 of the second hinge part 22 has a second connecting portion 223. The first connecting portion 213 and the second connecting portion 223 are coupled to each other through such as a protrusion portion and an indention portion on an axis A1 (refer to FIG. 4, FIG. 6A and FIG. 6B), so that the first shaft X1 of the first hinge part 21 and the second shaft X2 of the second hinge part 22 are on the same axis.

As indicated in FIG. 1, the key structure 2 further includes an attractable element 25 and a magnet 26. The attractable element 25 is disposed under the bridge assembly. In an embodiment, the attractable element 25 can be fixed under the bridge assembly through an engaging structure. In another embodiment, the bridge assembly 20 is made by using an in-mold injection method. First, the attractable element 25 is disposed inside a mold, and then plastics is heated and injected into the mold to form the first hinge part 21 and the second hinge part 22 of the bridge assembly 20, so that the first hinge part 21 or the second hinge part 22 formed by way of injection can be integrally formed in one piece with the attractable element 25 disposed inside the mold. The attractable element 25 and the magnet 26 can be deemed as a magnetic assembly. The magnet 26 is preferably made of permanent magnetic materials, which includes hard ferrites magnet and rare-earth Nd—Fe—B Magnet. Hard ferrites magnet is made of Sro, or Bao and Fe2O3 by ceramic manufacturing technology. Rare-earth Nd—Fe—B Magnet is mainly made of neodymium (Nd), iron (Fe), and boron (B) by method of metal melting and powder metallurgy, to be sintered with Al—Ni—Co, samarium (Sm)—Ni—Co, Sm—Co.

Figure 6A:
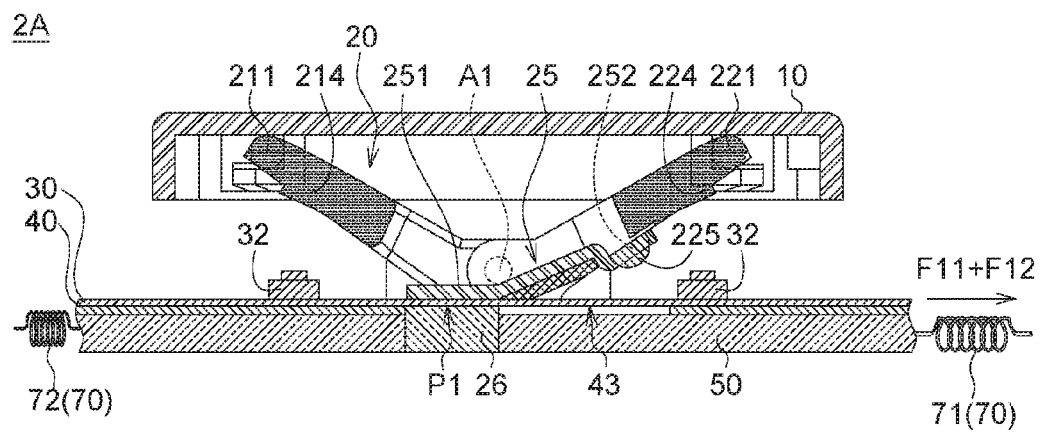
FIGS. 6A and 6B are cross-sectional views of a key structure along an A-A cross-sectional line of FIG. 5A when the key structure is pressed to change to a pressing status from a releasing status.

Refer to FIG. 2. In an embodiment, the attractable element 25 has a first end 251 and a second end 252. The first end 251 corresponds to a first attractive position P1, and the second end 252 corresponds to a second attractive position P2. Additionally, the magnet 26 provides a magnetic force and is movable between the underneath of the first attractive position P1 and the second attractive position P2. When the first end 251 of the attractable element 25 is attracted by the magnetic force and generates a reaction force to the bridge assembly 20, the first end 251 of the attractable element 25 is moved to the first attractive position P1 with respect to the axis A1 (refer to FIG. 4, FIG. 6A and FIG. 6B), so that the first hinge part 21 and the second hinge part 22 can be activated through the reaction force (that is a releasing status as indicated in FIG. 6A or FIG. 7A). Besides, when the second end 252 of the attractable element 25 is attracted by a magnetic force and generates a reaction force to the bridge assembly 20, the second end 252 of the attractable element 25 is moved to the second attractive position P2 with respect to the axis A1 (refer to FIG. 4, FIG. 6A and FIG. 6B), so that the first hinge part 21 and the second hinge part 22 can be activated through the reaction force (that is a storing status as indicated in FIG. 7B). Therefore, by changing the attraction between the magnet 26 and the first end 251 or the attraction between the magnet 26 and the second end 252 of the attractable element 25 to move the first hinge part 21 and the second hinge part 22, the bridge assembly 20 of the present embodiment can be switched between the releasing status and the storing status.

In an embodiment, the attractable element 25 can be formed of a ferromagnetic material, and the magnet 26 can be formed of a permanent magnet or an electromagnet.

Refer to FIG. 2. In an embodiment, the key cap 10 includes a plurality of link bar supporting portions 102 on the bottom of key cap 10 for fixing or slidably supporting the first link bar 211 of the first hinge part 21 and the second link bar 221 of the second hinge part 22. In an embodiment, a first actuation portion 214 is protruded and disposed at the part in the outer side of the first hinge part 21 near the first link bar 211. The first actuation portion 214 is correspondingly located above a touch portion 32, such that when the key cap 10 is pressed, the first actuation portion 214 can touch the touch portion 32 to generate a key pressing signal. In another embodiment, a second actuation portion 224 is protruded and disposed at the part in the outer side of the second hinge part 22 near the second link bar 221. The second actuation portion 224 is correspondingly located above another touch portion 32, such that when the key cap 10 is pressed, the second actuation portion 224 can contact the other touch portion 32 to generate a key pressing signal. In other words, the key structure 2 of the invention has at least one actuation portion contacting at least one touch portion 32 to generate a key pressing signal.

Refer to FIG. 2. In an embodiment, a stopping portion 225 protruded outside more than the second actuation portion 224 is disposed at the outer side of the first hinge part 21 and/or the second hinge part 22 and correspondingly located above the second attractive position P2. When the magnet 26 is moved to the underneath of the second attractive position P2 to attract the second end 252 of the attractable element 25, the stopping portion 225 contacts the magnet 26 (the second attractive position P2 of FIG. 7B), so that the second actuation portion 224 cannot contact the touch portion 32, hence avoiding the key pressing signal being generated during the storing status. Detailed structures of the stopping portion 225 not disclosed here can be obtained with reference to the descriptions of FIGS. 6B and 7B.

Figure 3:
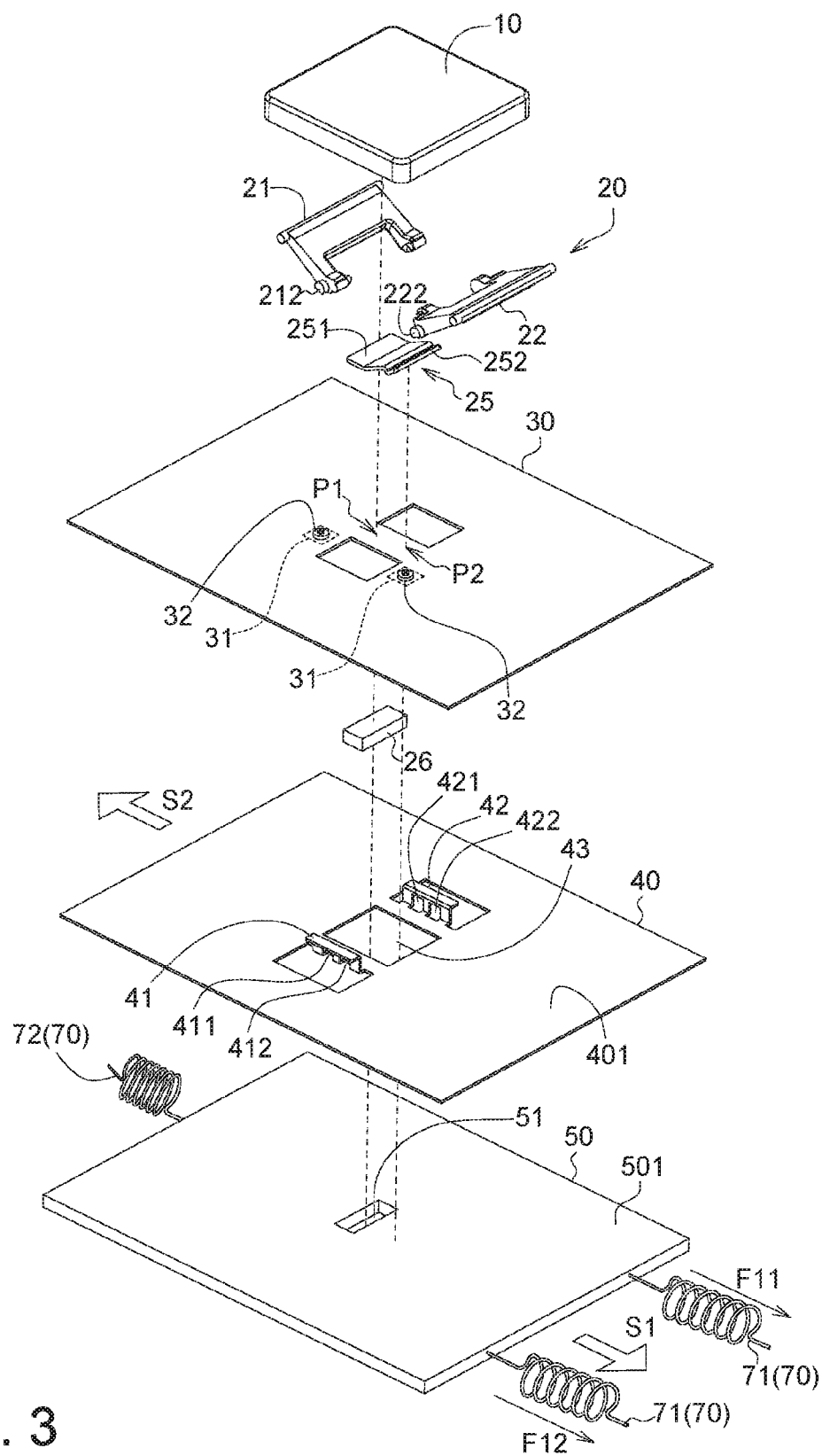
FIG. 3 is a decomposition diagram of a key structure before assembly according to an embodiment of the invention.
Figures 1, 4:
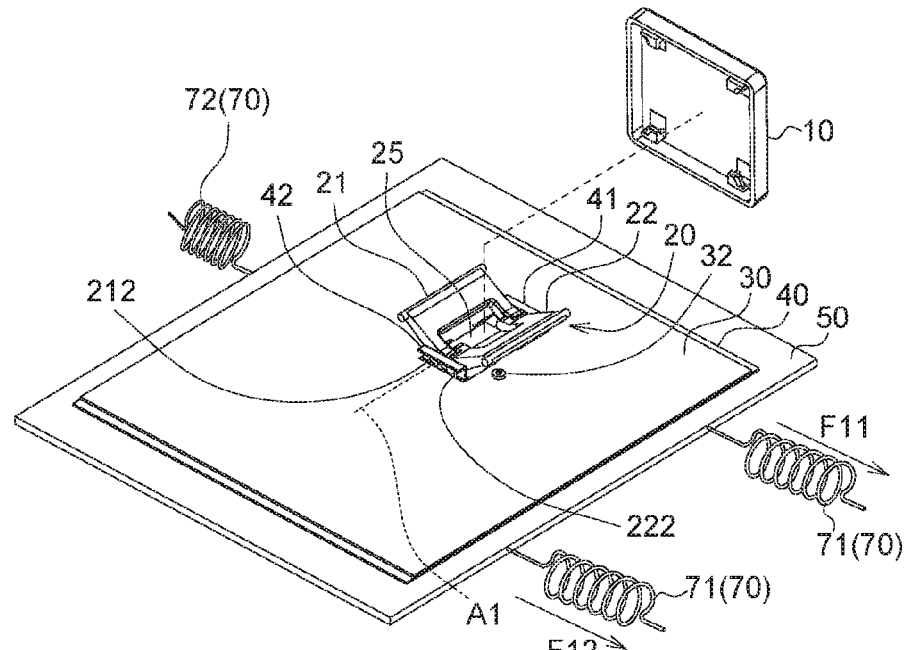
Figures 2, 4:
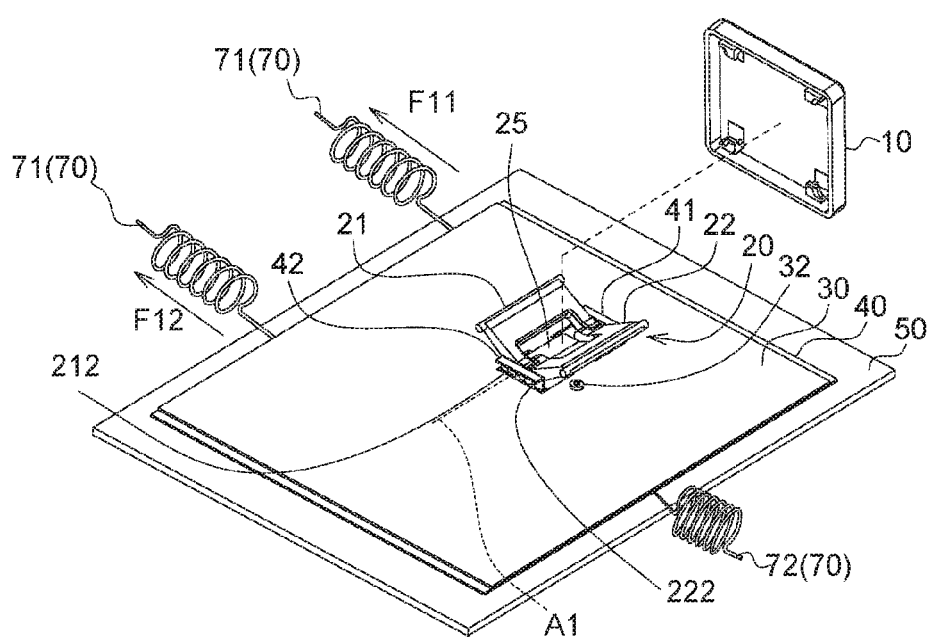

Refer to FIG. 3, a decomposition diagram of a key structure 2A before assembly according to an embodiment of the invention is shown. In an embodiment, the key structure 2A further includes a film circuit board 30, a supporting board 40, a base board 50 and a pre-stressing force applying assembly 70. The film circuit board 30 can be disposed on the supporting board 40 or integrally formed in one piece with the supporting board 40. The supporting board 40 is disposed on the base board 50. Refer to FIG. 4-1. In an embodiment, when the base board 50 is a sliding board, the pre-stressing force applying assembly 70 is connected between the base board 50 and the casing of the portable computer (referring to FIG. 12A), so that the base board 50 can be easily pulled without using too much effort. Refer to FIG. 4-2. In an embodiment, when the supporting board 40 is a sliding board, the pre-stressing force applying assembly 70 is connected between the supporting board 40 and the casing of the portable computer (referring to FIG. 12A), so that the supporting board 40 can be easily pulled without using too much effort.

Figure 15:
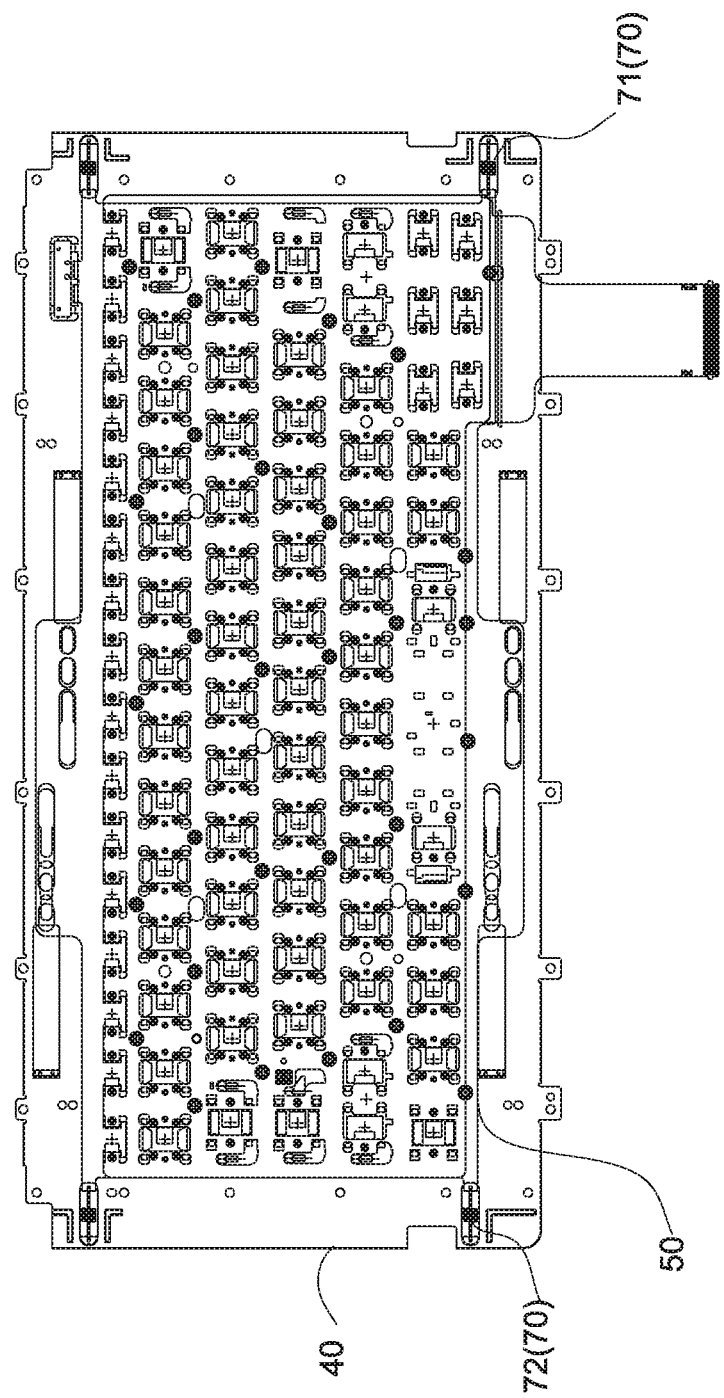
FIG. 15 is a schematic disposition diagram of a pre-stressing force applying assembly according to an embodiment of the invention.

In an embodiment, when the peripheral area of the supporting board 40 extends outside the base board 50, the pre-stressing force applying assembly 70 is assembled in each open slot on the peripheral area of the supporting board 40 and is connected between the base board 50 and the supporting board 40. Refer to FIG. 15. One end of the first elastic part 71 is connected to the slidable base board 50, and another end is connected to the fixed supporting board 40. One end of the second elastic part 72 is connected to the slidable base board 50 and another end is connected to the fixed supporting board 40. When the base board 50 or the supporting board 40 slides, the pre-stressing force applying assembly 70 reduces the resistance during the back and forth sliding of the base board 50 or the supporting board 40.

The pre-stressing force applying assembly 70 can be realized in many different ways. For example, the pre-stressing force applying assembly 70 may include two first elastic part 71 and at least one second elastic part 72. The disposition of having two or more than two first elastic parts 71 and the second elastic part 72 can make the applied force uniformly distributed (referring to the disposition style of FIG. 15), but the invention is not limited thereto. The first elastic part 71 and the second elastic part 72 can be realized by tension springs, and the coefficient of elasticity of the first elastic part 71 can be larger than or equivalent to the coefficient of elasticity of the second elastic part 72, so that the restoring force generated when the first elastic part 71 is stretched (that is, the first pre-stressing force) is larger than the restoring force generated when the second elastic part 72 is stretched (that is, the second pre-stressing force). The first elastic part 71 and the second elastic part 72 can also be realized by compression springs by swapping the position of the first elastic part 71 with the position of the second elastic part 72, and the invention is not limited thereto.

Refer to FIGS. 3, 3-6, 4-1, 4-2, 5B, 9, 10-1, 10-2. The quantity of first elastic part 71 is exemplified by two, and the quantity of second elastic part 72 is exemplified by one. When multiple first elastic parts 71 are connected in parallel, the larger the quantity of first elastic parts 71 connected in parallel, the larger the total pulling force generated by the first elastic part 71 (proportional to the quantity), and the base board 50 or the supporting board 40 is easier to be pulled and moved to the second attractive position. When multiple second elastic parts 72 are connected in parallel, the larger the quantity of second elastic parts 72 connected in parallel, the larger the total pulling force generated by the second elastic part 72 (proportional to the quantity), and the base board 50 or the supporting board 40 is easier to be pulled and moved to the first attractive position. According to the design of force balance, when the magnetic element is under the first attractive position, the distance between the magnetic element 26 and the attractable element 25 is shorter and the magnetic force is stronger. Therefore, the first elastic part 71 needs to generate and pre-apply a larger first pre-stressing force on the base board 50 for moving the magnetic element 26 to the second attractive position. Besides, when the magnetic element 26 is under the second attractive position, the distance between the magnetic element 26 and the attractable element 25 is longer and the magnetic force is weaker. Therefore, the second elastic part 72 does not have to generate and apply a larger second pre-stressing force (smaller than the first pre-stressing force) on the base board 50, and the magnetic element 26 still can be moved to the first attractive position easily.

It should be noted that when the magnetic element 26 is under the first attractive position, the first pre-stressing force generated by the first elastic part 71 needs to be smaller than the sum of the magnetic force between the magnetic element 26 and the attractable element 25 and the frictional force between the base board 50 and the supporting board 40, otherwise the base board will move automatically and cause trouble to the user. For example, when the sum of the magnetic force between the magnetic element 26 and the attractable element 25 and the frictional force between the base board 50 and the supporting board 40 is equivalent 3 $kg/m^2$, the first pre-stressing force generated by the first elastic part 71 can range between 1.5~2 $kg/m^2$, and the key structure will remain in a releasing state unless a sufficient external driving force is provided. Besides, when the magnetic element 26 is under the second attractive position, the second pre-stressing force generated by the second elastic part 72 needs to be smaller than the sum of the magnetic force between the magnetic element 26 and the attractable element 25 and the frictional force between the base board 50 and the supporting board 40. For example, when the sum of the magnetic force between the magnetic element 26 and the attractable element 25 and the frictional force between the base board 50 and the supporting board 40 is equivalent to 2 $kg/m^2$, the second pre-stressing force generated by the second elastic part 72 can range between 1~1.5 $kg/m^2$, and the key structure will remain in a storing state unless a sufficient external driving force is provided.

Once the pre-stressing force generated by the first elastic part 71 and the second elastic part 72 grows, the required external driving force is relatively reduced, so the user can easily move the base board 50 or the supporting board 40 without using much effort. Therefore, the pre-stressing force applying assembly 70 can achieve effort saving effect and improve user experience. Similarly, if the external driving force is provided using a non-manual method (such as using power), the base board 50 or the supporting board 40 can be pulled by using a small amount of power. Therefore the pre-stressing force applying assembly 70 can achieve power saving effect. Since the slidable base board 50 or the supporting board 40 can be easily moved, the lifespan of the keypad can be prolonged. Detailed operations of the pre-stressing force applying assembly 70 are disclosed in following embodiments.

Refer to FIG. 3. In an embodiment, the touch portion 32 is disposed on the film circuit board 30 and corresponds to a position of a switch element 31 of the film circuit board 30. When the touch portion 32 is pressed, the switch element 31 disposed under the touch portion 32 is activated to generate a key pressing signal. The key pressing signal can be transmitted to a position processor (not illustrated) via the circuit of the film circuit board 30. Then, the position processor calculates the coordinate position of the key and generates a key pressing instruction corresponding to the key.

In an embodiment, the touch portion 32 can be formed of an elastic material such as rubber, epoxy resin, semi-cured colloid or plastics in the shape of a dome.

In an embodiment, the switch element 31 includes an upper conductive layer and a lower conductive layer (not illustrated), which are separated by a gap. When the touch portion 32 is pressed, the upper conductive layer and the lower conductive layer contact each other to generate a key pressing signal.

Figure 5A:
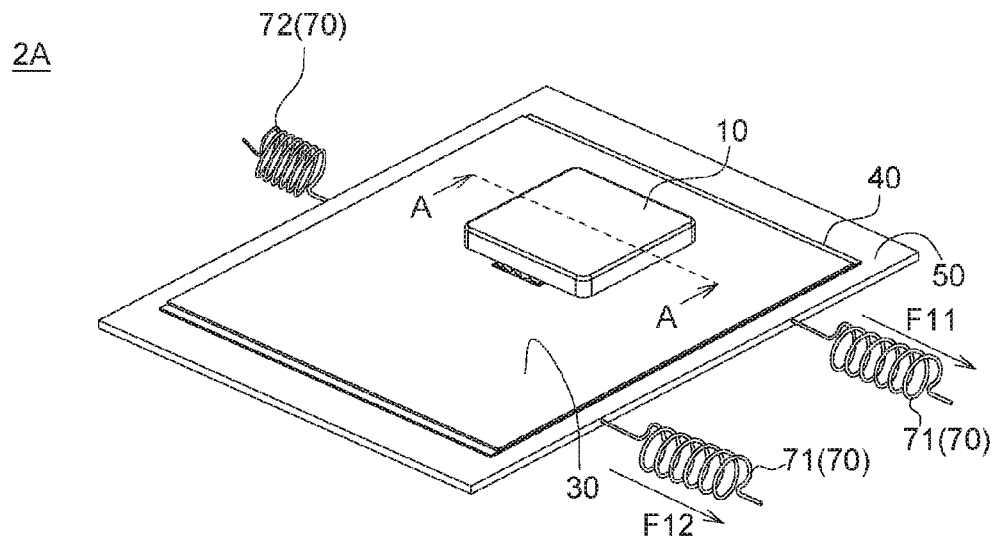
FIGS. 5A and 5B are appearance diagrams of the key structure of FIG. 4 in a releasing status (that is, a serviceable status such as when the upper cover of the portable computer is opened) and a storing status (such as when the upper cover and the body of the portable computer are closed), respectively.
Figure 5B:
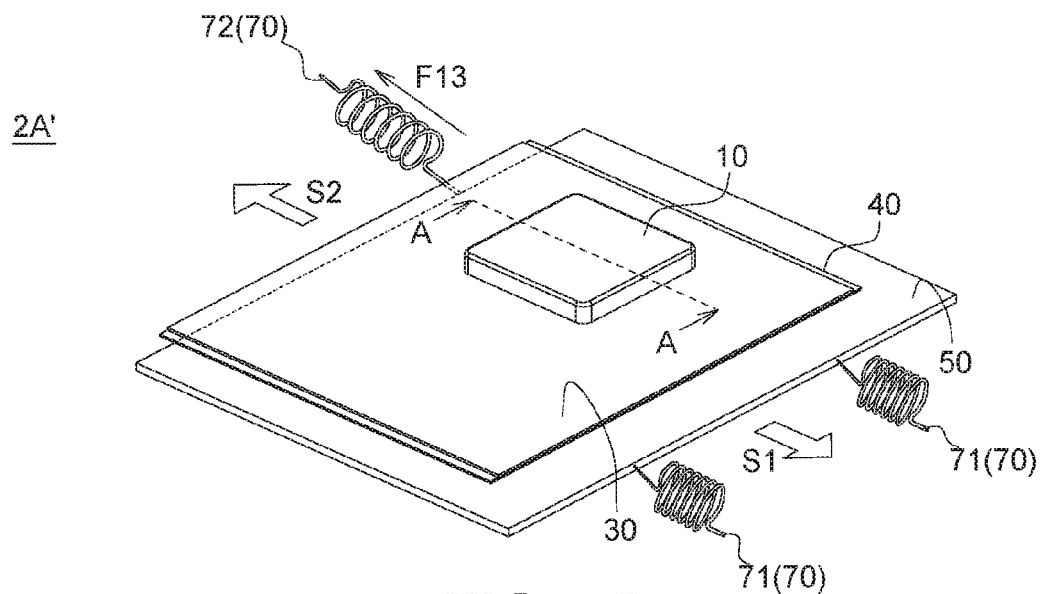

Refer to FIGS. 3 and 4-1. The supporting board 40 includes a first supporting part 41 and a second supporting part 42 which are opposite to each other and erected on the supporting side 401. The first supporting part 41 includes two first pivot holes 411 and 412, and the second supporting part 42 includes two second pivot holes 421 and 422. The first pivot holes 411 and 412 and the second pivot holes 421 and 422 are disposed oppositely for receiving two ends of the first pivot coupling portion 212 and two ends of the second pivot coupling portion 222, respectively. In an embodiment, the two ends of the first pivot coupling portion 212 of the first hinge part 21 can be located at the first pivot hole 411 and the second pivot hole 421, respectively; the two ends of the second pivot coupling portion 222 of the second hinge part 22 can be located at the other first pivot hole 412 and the other second pivot hole 422, respectively. Thus, the key cap 10 can be assembled onto the supporting board 40 through the bridge assembly 20 and can move upward/downward with respect to the supporting board 40. Referring to FIGS. 5A and 6A, when the key structure 2A is in the releasing state, the key cap 10 ascends to a higher position with respect to the supporting board 40. Referring to FIGS. 5B and 7B, when the key structure 2A is in a releasing state, the key cap 10 descends to a lower position with respect to the supporting board 40.

Referring to FIG. 3, the base board 50 can be a metal board or a reinforced plastic substrate. The base board 50 is disposed under the supporting board 40 to reinforce the rigid structure of the supporting board 40. In other words, the base board 50 can be used as a base of the keyboard, and there is no need to additionally dispose a board on the base of the keyboard, hence reducing the weight and cost of the keyboard. In another embodiment, when the supporting board 40 has sufficient rigidity, the supporting board 40 can also be used as a base of the keyboard and there is no need to additionally dispose the base board 50 under the supporting board 40.

Refer to FIG. 3. In an embodiment, the supporting board 40 is a fixing board (fix to the case of the portable computer, for example), the base board 50 is a sliding board, and the base board 50 can move along a first sliding direction S1, so that the base board 50 and the supporting board 40 can slide with respect to each other.

In another embodiment, the base board 50 is a fixing board (fix to the case of the portable computer, for example), the supporting board 40 is a sliding board, and the supporting board 40 can move along a second sliding direction S2 inverse to the first sliding direction S1, so that the base board 50 and the supporting board 40 can slide with respect to each other. In other words, as long as one of the base board 50 and the supporting board 40 is slidable, relative movement can be generated between the base board 50 and the supporting board 40.

Refer to FIG. 3. In an embodiment, the supporting board 40 has a first opening 43, and the base board 50 has a second opening 51. The first opening 43 and the second opening 51 are basically located under the attractable element 25 and are capable of receiving the magnet 26. The second opening 51 can fix the magnet 26 on the base board 50. The size of the first opening 43 is, for example, larger than that of the second opening 51. The first opening 43 provides an operation space, so that the magnet 26 is movable between the underneath of the first attractive position P1 and the underneath of the second attractive position P2.

In an embodiment, when the magnet 26 is disposed in the second opening 51 passing through the base board 50, a bonding layer 60 (refer to FIGS. 11A and 11B), such as a polyester film or a Mylar layer, can be disposed under the base board 50 for shielding the underneath of the second opening 51, so that the magnet 26 can be fixed, such as adhering or attaching, on the bonding layer 60 in the second opening 51 of the base board 50.

Refer to FIGS. 4-1 and 4-2. In an embodiment, the first hinge part 21 and the second hinge part 22 are assembled onto the supporting board 40 through the first supporting part 41 and the second supporting part 42, respectively. After assembly, the first hinge part 21 and the second hinge part 22 are connected as one piece and the rotation center is located on the axis A1. Refer to FIGS. 1 and 4-1. Since the first shaft X1 and the first pivot coupling portion 212 are not coaxial and the second shaft X2 and the second pivot coupling portion 222 are not coaxial either, the first pivot coupling portion 212, the second pivot coupling portion 222 and the axis A1 used as the rotation center form three non-coaxial hinge points (such as in the shape of W, referring to FIG. 13). Therefore, after assembly, the first hinge part 21 and the second hinge part 22 basically form a W-shaped structure.

Figure 6B:
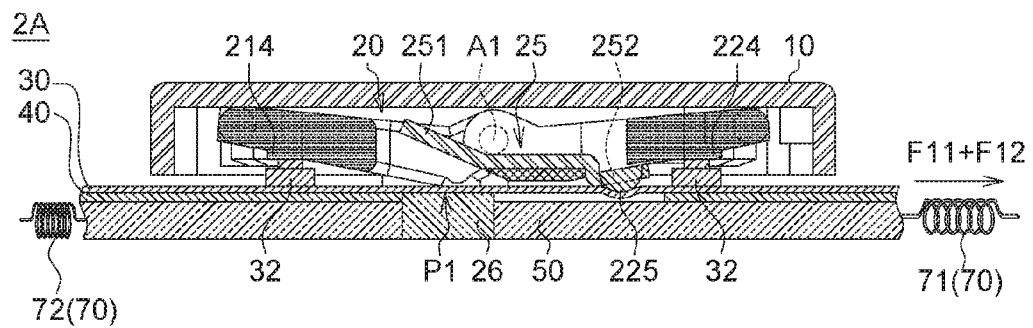
Figure 7A:
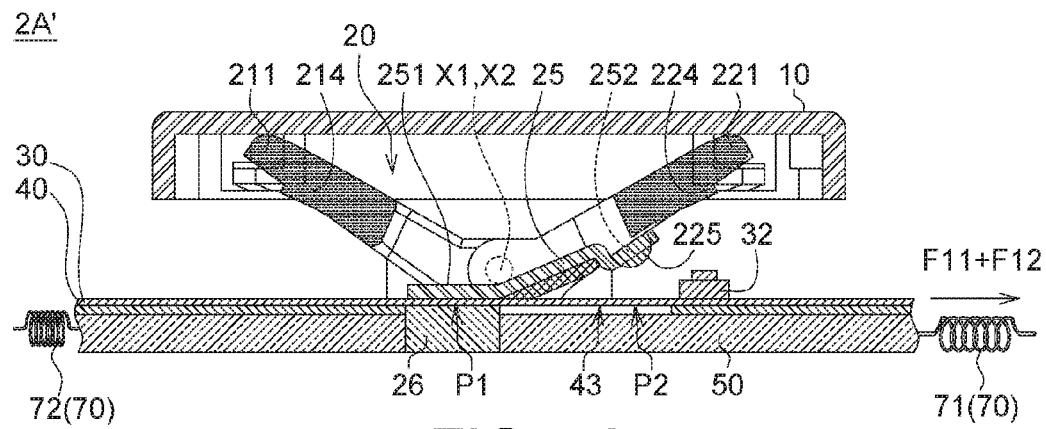
FIGS. 7A and 7B are cross-sectional views of the key structure along an A-A cross-sectional line of FIG. 5B when the key structure is changed to a storing status from a releasing status.
Figure 7B:
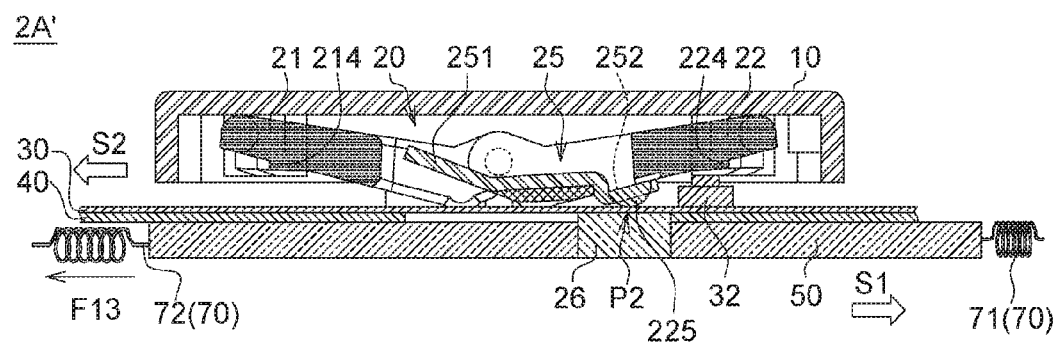

Refer to FIGS. 5A, 6A and 6B. In an embodiment, when the key cap 10 is not pressed, the first end 251 of the attractable element 25 is attracted by the magnet 26 and fixed at the first attractive position P1, so that the key cap 10 and the bridge assembly 20 enter a releasing status. Meanwhile, the base board 50 is fixed by the magnetic force and is not moved; the first elastic part 71 disposed on the first side of the base board 50 is stretched by a first distance to generate the first pre-stressing force; the second elastic part 72 disposed on the second side of the base board 50 is not stretched and therefore does not generate any force. Further, refer to FIG. 6B. When the key cap 10 is pressed, the first end 251 of the attractable element 25 is driven to move away from the magnet 26, so that the key cap 10 is moved to a pressing position from a releasing position. Then, when the key cap 10 is released, the first end 251 of the attractable element 25 is again attracted by the magnet 26, so that the key cap 10 and the bridge assembly 20 are driven to the releasing position by the magnetic force. Therefore, when the user presses or releases the key structure 2A, the key structure 2A is moved upward and downward between a pressing position and a releasing position by the magnetic force.

Refer to FIGS. 5B, 7A and 7B. In an embodiment, when the base board 50 slides with respect to the supporting board 40 along a first sliding direction S1, the key structure 2A enters a storing status, the base board 50 is fixed by the magnetic force and is not moved; the first elastic part 71 disposed on the first side of the base board 50 no more generates a first pre-stressing force (F11+F12) as the stretched distance decreases; the second elastic part 72 disposed on the second side of the base board 50 generate a second pre-stressing force F13 as the stretched distance increases. Refer to FIG. 7A. In an embodiment, when the key cap 10 is not pressed (that is, in a releasing status), the first end 251 of the attractable element 25 is attracted by the magnet 26, so that the key cap 10 and the bridge assembly 20 are attracted by the magnetic force and fixed on a releasing position and the first elastic part 71 generates the first pre-stressing force (F11+F12). Refer to FIG. 7B. In an embodiment, when the base board 50 slides with respect to the supporting board 40 along a first sliding direction S1, the second end 252 of the attractable element 25 is attracted by the magnet 26 moved to the second attractive position P2, so that the key cap 10 and the bridge assembly 20 are attracted by the magnetic force and moved to a storing position (that is, in a storing status) from the releasing position (that is, in a releasing status) and the second elastic part 72 generates the second pre-stressing force F13. When the key cap 10 is moved to the storing position, the receiving space that the key structure 2A requires will be relatively reduced, and the overall height of the key structure 2A will be reduced accordingly.

In an embodiment, when the base board 50 inversely slides with respect to the supporting board 40 along the second sliding direction S2, the first end 251 of the attractable element 25 will again be attracted by the magnet 26 moved to the first attractive position P1, so that the key cap 10 and the bridge assembly 20 are attracted by the magnetic force and moved to a releasing position. Therefore, the key structure 2A can be changed to a releasing position or a storing position by sliding the base board 50 or the supporting board 40. The same key storage effect can be achieved by sliding the base board 50 with respect to the supporting board 40 or sliding the supporting board 40 with respect to the base board 50, and the invention does not have specific restrictions thereto.

Detailed descriptions of the stopping portion 225 can be obtained with reference to FIGS. 6B and 7B. In an embodiment, the stopping portion 225 can be a protrusion with a predetermined height. As indicated in FIG. 6B, when the key cap 10 is pressed to enter a pressing status, the magnet 26 is not moved and is not located under the stopping portion 225, so the each of first actuation portion 214 and the second actuation portion 224 can actually contact a corresponding touch portion 32 disposed thereunder to generate a key pressing signal. As indicated in FIG. 7B, when the key cap 10 enters a storing status, the magnet 26 is moved to the underneath of the stopping portion 225, and the stopping portion 225 moves downward to collide with the magnet 26 (the thin film circuit board 30 is interposed therebetween) on the second attractive position P2, such that the key cap 10 is stopped at a predetermined height and cannot reach the pressing position (that is, the first actuation portion 214 or the second actuation portion 224 cannot contact the touch portion 32 disposed underneath). Therefore, since the height of the key cap 10 at the stopping position is slightly higher than that at the pressing position, the key structure 2A of the present embodiment will not generate any key pressing signals or malfunctions in the storing status.

Figure 8:
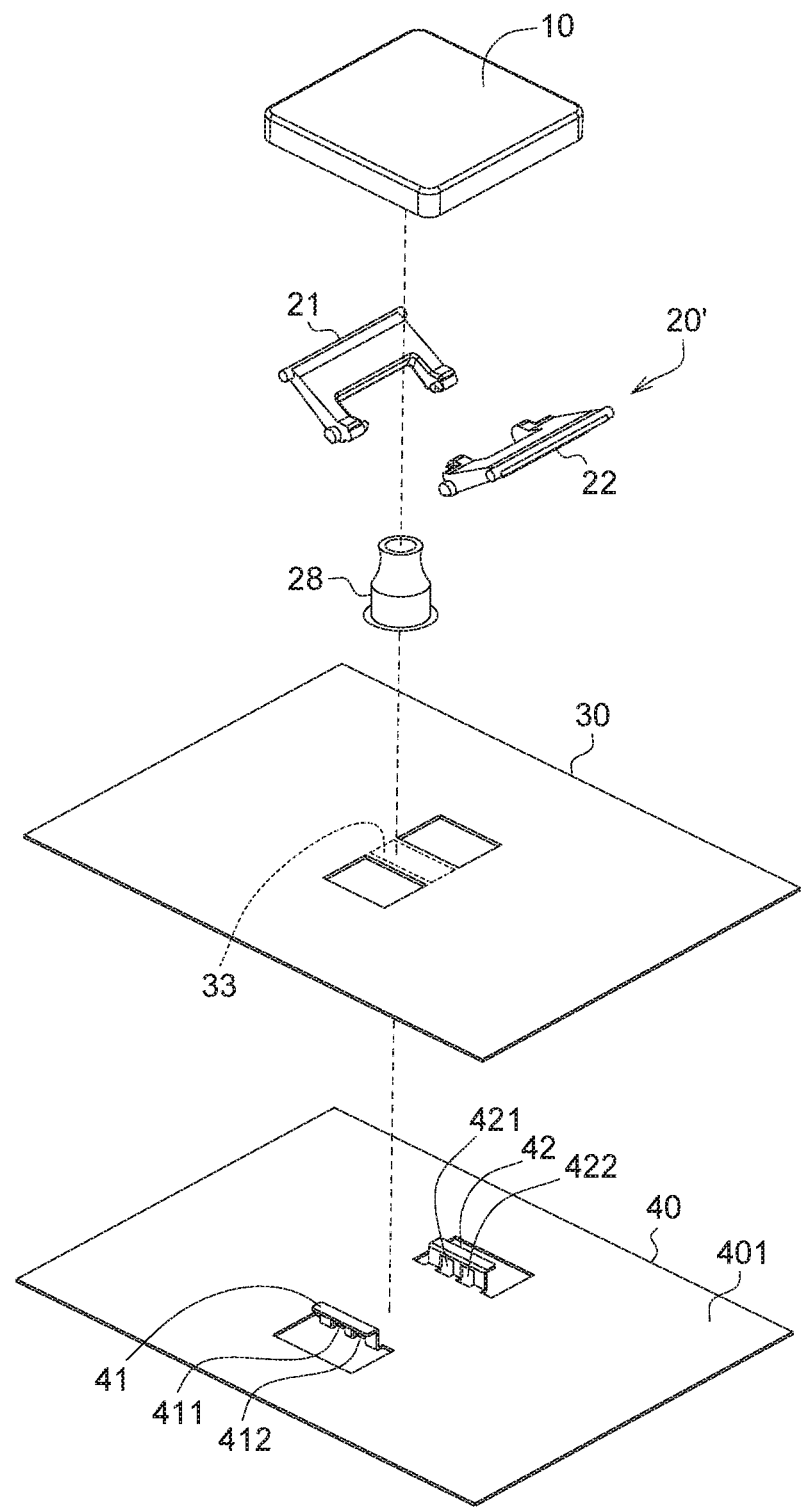
FIG. 8 is a decomposition diagram of a key structure before assembly according to another embodiment of the invention.

Refer to FIG. 8, a decomposition diagram of a key structure 2B before assembly according to another embodiment of the invention is shown. The key structure 2B includes a key cap 10, a bridge assembly 20', an elastic member 28, a thin film circuit board 30 and a supporting board 40. The elastic member 28 replaces the assembly of the attractable element 25 and the magnet 26. The elastic member 28 is disposed under the key cap 10 and located between the first hinge part 21 and the second hinge part 22. The elastic member 28 is deformed when the key cap 10 is pressed, and generates a recovery elastic force when the key cap 10 is released. Therefore, the key cap 10 and the bridge assembly 20' can be moved upward and downward between a releasing position and a pressing position by the elastic force of the elastic member 28. Additionally, the elastic member 28 is disposed on the thin film circuit board 30 and correspondingly located at a switch element 33. When the elastic member 28 is pressed, the switch element 33 disposed under the elastic member 28 is activated to generate a key pressing signal. The elastic member 28 is recovered from the aforesaid deformation when the key cap 10 is released. Therefore, there is no need to dispose any of the first actuation portion 214, the second actuation portion 224 and the stopping portion 225 on the bridge assembly 20' of the present embodiment, and there is no need to disposed two corresponding touch portions 32 on the film circuit board 30 either.

Figure 9:
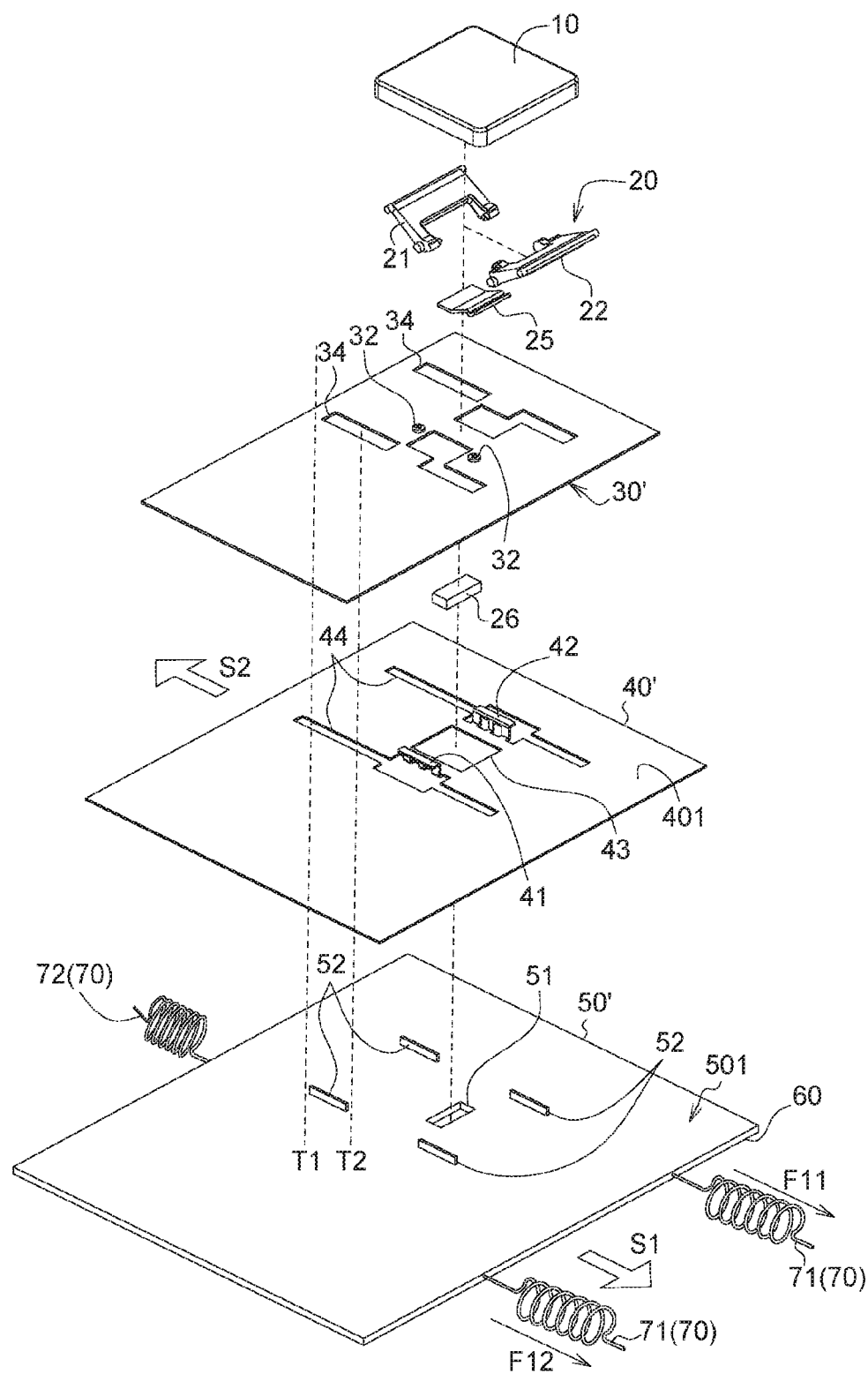
Figures 1, 10:
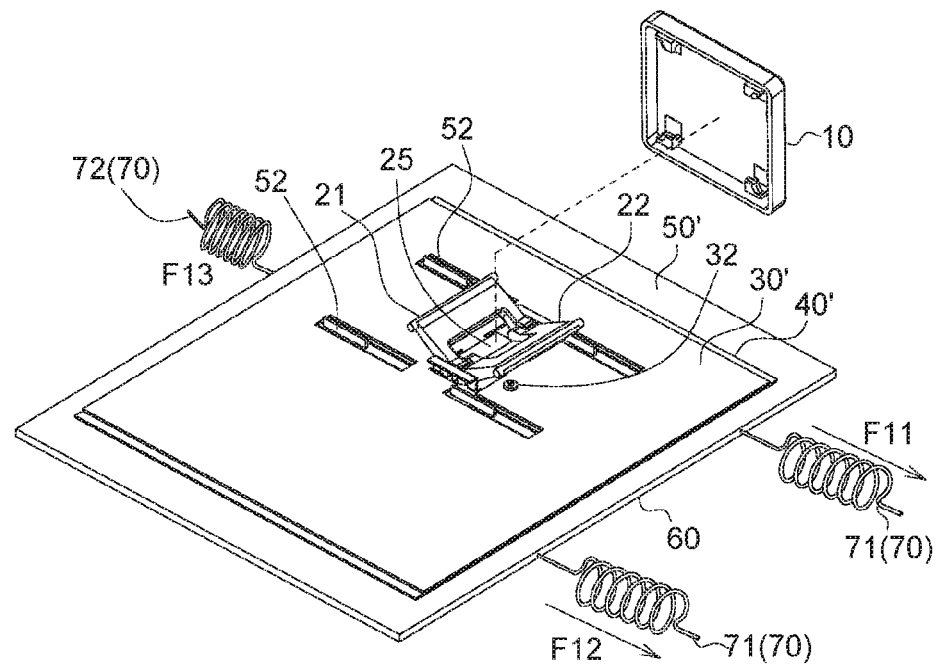
Figures 2, 10:
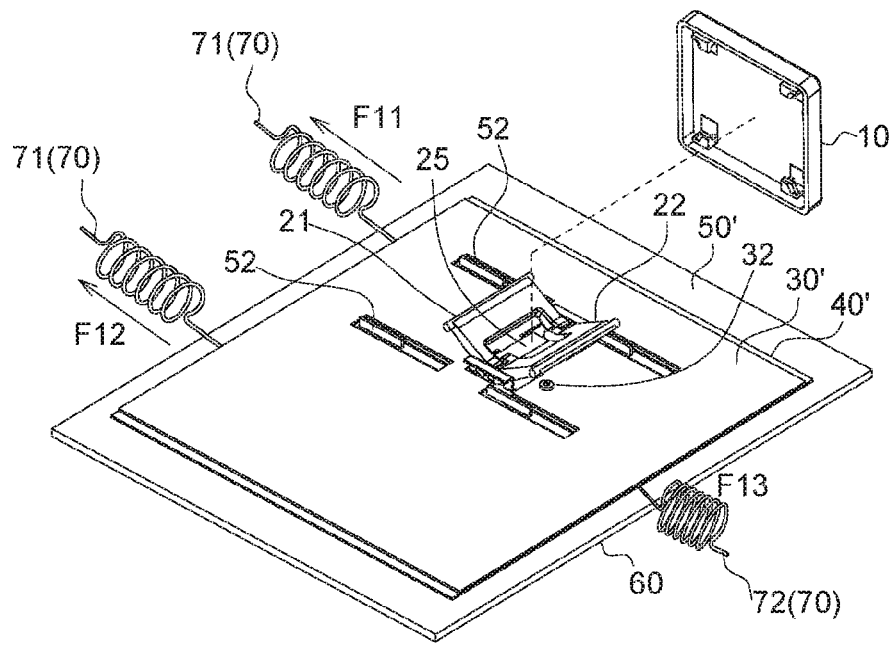

FIGS. 9, 10-1 and 10-2 are decomposition diagrams of a key structure 2C before assembly and after assembly respectively according to an embodiment of the invention. Refer to FIG. 9. The key structure 2C includes a key cap 10, a bridge assembly 20, an attractable element 25, a magnet 26, a thin film circuit board 30', a supporting board 40', a base board 50', a bonding layer 60, a first elastic part 71 and a second elastic part 72. As indicated in FIG. 10-1, the base board 50 is a sliding board; the first elastic part 71 and the second elastic part 72 are connected to the first side and the second side of the base board 50, respectively. As indicated in FIG. 10-2, the supporting board 40 is a sliding board; the first elastic part 71 and the second elastic part 72 are connected to the first side and the second side of the supporting board 40, respectively.

In an embodiment, the base board 50' includes a plurality of stopping parts 52 erected on the upper surface 501, and the supporting board 40' and the thin film circuit board 30' include a plurality of first grooves 44 and a plurality of second grooves 34, and each stopping part 52 is received in corresponding first groove 44 and second groove 34. The stopping parts 52 are disposed in parallel along a first sliding direction S1 or a second sliding direction S2. In an embodiment, the base board 50', such as a sliding board, slides with respect to the supporting board 40' along the first sliding direction S1, so that the stopping part 52 is moved to a stopping position T2 from a non-stopping position T1 and contacts the key cap 10. In another embodiment, the supporting board 40', such as a sliding board, slides with respect to the base board 50' along the second sliding direction S2, so that the stopping part 52 is moved to a stopping position T2 from a non-stopping position T1 and contacts the key cap 10. The stopping part 52 can be a rectangular piece with a predetermined height.

Figure 11A:
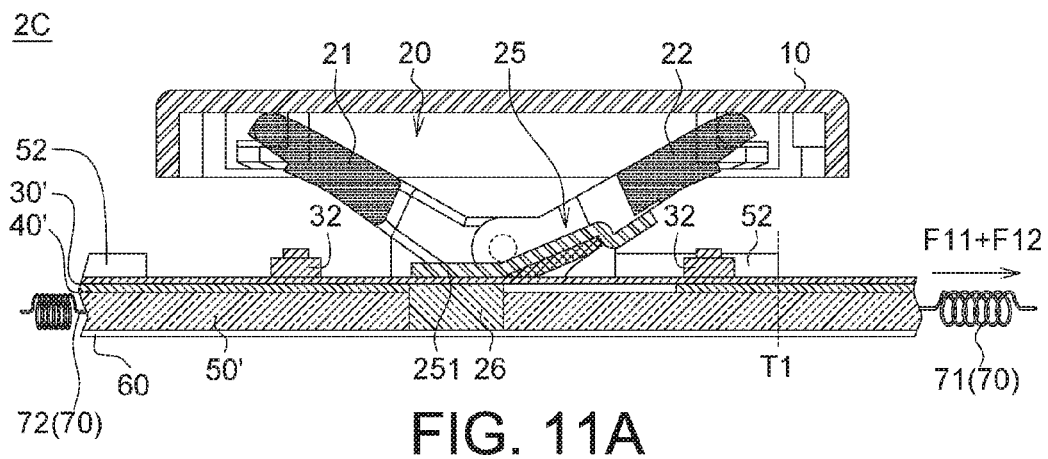
FIGS. 11A and 11B are cross-sectional views of the key structure of FIG. 10-1 when the key structure is changed to a storing status from a releasing status.
Figure 11B:
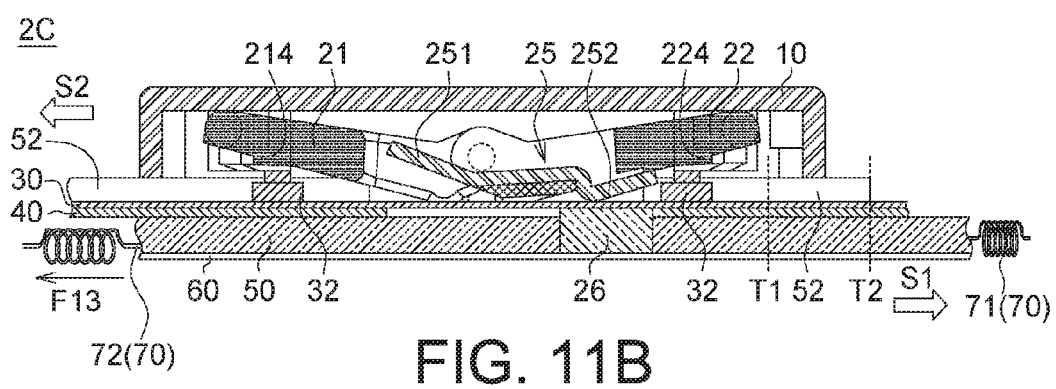

FIGS. 11A and 11B are cross-sectional views of the key structure 2C of FIG. 10 when the key structure 2C is changed to a storing status from a releasing status. Refer to FIG. 11A. In an embodiment, when the key cap 10 is not pressed, the first end 251 of the attractable element 25 is attracted by the magnet 26, so that the key cap 10 and the bridge assembly 20 remain at a releasing status through the magnetic force, and the first elastic part 71 is stretched by a first distance to generate the first pre-stressing force (F11+F12). The second elastic part 72 is not stretched and therefore does not generate any force. Refer to FIG. 11B. In an embodiment, when the base board 50' slides with respect to the supporting board 40' along the first sliding direction 51 or when the supporting board 40' slides with respect to the base board 50' along the second sliding direction S2, the second end 252 of the attractable element 25 is attracted by the magnet 26 which has slid, so that the key cap 10 and the bridge assembly 20 are attracted by the magnetic force and moved to a storing position from the releasing position, and the first elastic part 71 no more generates a first pre-stressing force as the stretched distance decreases. The second elastic part 72 generates a second pre-stressing force F13 as the stretched distance increases. As indicated in FIG. 11B, when the stopping part 52 is moved to the underneath of one side of the key cap 10 from a non-stopping position T1, the key cap 10 moved downward collides the stopping part 52 moved to the stopping position T2, such that the key cap 10 is stopped at a predetermined height and cannot reach a pressing position. Therefore, since the height of the key cap 10 at the stopping position is slightly higher than that at the pressing position, the first actuation portion 214 and the second actuation portion 224 cannot contact the two corresponding touch portions 32 disposed thereunder, and the key structure 2C will not generate any key pressing signal or malfunctions at the storing status.

In the above embodiments, the key structure 2C can be changed to a storing status from a releasing status as long as the base board 50' slides with respect to the supporting board 40' or the supporting board 40' slides with respect to the base board 50'. Descriptions of the connecting assembly driving the key structure 2C to change to the storing status from the releasing status are disclosed in a number of embodiments below with accompanying drawings.

FIGS. 12A and 12B are cross-sectional views of any key structure (such as 2, 2A, 2A', 2C, 2D and 2E) of the invention disposed in a portable computer 4 and changed to a storing status from a releasing status as the upper cover 7 is closed. Refer to FIG. 12A. The portable computer 4 includes an upper cover 7, a lower cover 5 and a hinge 6. The upper cover 7 and the lower cover 5 are coupled to the hinge 6. The key structure 2C is disposed on the lower cover 5. When the upper cover 7 is rotated with respect to the hinge 6 and opened to an angle θ (such as larger than or equal to 90°), the base board 50' or the supporting board 40' of the key structure 2C is driven by the connecting assembly and makes the key structure 2C enter a releasing status (that is, a serviceable status). Refer to FIG. 12B. When the upper cover 7 is rotated with respect to the hinge 6 and closed on the lower cover 5, the base board 50' or the supporting board 40' of the key structure 2C is driven by the connecting assembly and makes the key structure 2C enter a storing status, such that the overall height of the key structure 2C and the allowable thickness of the portable computer 4 can be effectively reduced.

Refer to FIGS. 12A and 12B. In an embodiment, the connecting assembly includes a moving part 8 coupled between the hinge 6 and the base board 50' or between the hinge 6 and the supporting board 40'. The hinge 6 has first teeth 61, the moving part 8 has second teeth 81, and the first teeth 61 and the second teeth 81 are engaged with each other. Therefore, when the upper cover 7 is rotated with respect to the hinge 6 to be opened or closed, the hinge 6 drives the first teeth 61 and the second teeth 81 so that the base board 50' or the supporting board 40' is driven to slide, and the key structure 2C can be changed between the releasing status and the storing status.

In an embodiment, the moving part 8 can be formed of a part of the base board 50' or the supporting board 40' extended to the underneath of the hinge 6. That is, a part of the base board 50' extended to the underneath of the hinge 6 has a second teeth 81 engaged with the first teeth 61 of the hinge 6. Alternatively, a part of the supporting board 40' extended to the underneath of the hinge 6 has a second teeth 81 engaged with the first teeth 61 of the hinge 6.

In another embodiment, the moving part 8 can also be coupled to the hinge 6 through frictional contact or gripping-driving means, such that the moving part 8 can be driven by the hinge 6 to slide horizontally. Besides, when the moving part 8 is realized by a flexible part, the moving part 8 can be coupled to the hinge 6 through rotating-driving means, so that the moving part 8 can be driven by the hinge 6 to rotate around the hinge 6. Thus, in the present invention, the way for driving the base board 50' or the supporting board 40' is not limited to the use of teeth engagement.

Refer to FIGS. 12A and 12B. In another embodiment, the base board 50' or the supporting board 40' can also be coupled to a controller 9 through the said connecting assembly (such as the moving part 8). When the upper cover 7 is rotated with respect to the hinge 6 to be opened or closed, the controller 9 drives the connecting assembly to slide the base board 50' or the supporting board 40' and makes the key structure 2C enter a releasing status or a storing status. In an embodiment, the controller 9 can drive the moving part 8 by electric power or a magnetic force or can be coupled to the base board 50' or the supporting board 40' through a connecting assembly such as a belt or a gear. Thus, in the present invention, the connecting part for driving the base board 50' or the supporting board 40' is not limited to the hinge 6, and other connecting parts can also be used to drive the base board 50' or the supporting board 40'. It is noted that the first pre-stressing force generated by the stretched first elastic part 71 and the second pre-stressing force generated by the stretched second elastic part 72 in the above embodiments can reduce the resistance during the sliding of the base board or the supporting board driven by the connecting part, so that in the situation of the overall height of the key structure 2C and the allowable thickness of the portable computer 4 being effectively reduced, the user can open or close the cover 7 of the portable computer 4 with less effort.

Figure 13:
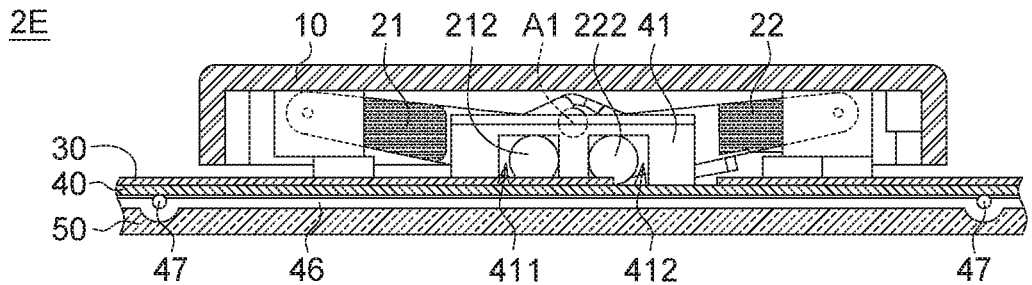
FIG. 13 is a cross-sectional view of a key structure with a sliding function layer according to an embodiment of the invention.

FIG. 13 is a cross-sectional view of a key structure 2E with smoothing function according to an embodiment of the invention. The key structure 2E further includes a lubricating layer 46, which can be a film having low index of friction and formed of polytetrafluoroethylene (PTFE), Teflon or other lubricating material. Refer to FIG. 15. In an embodiment, the lubricating layer 46 is coated on the surface of the supporting board 40 or the base board 50, so that the lubricating layer 46 is located between the supporting board 40 and the base board 50 to reduce the sliding friction. Additionally, the key structure 2E further includes a plurality of rollers 47 disposed between the supporting board 40 and the base board 50 for reducing the contact area between the supporting board 40 and the base board 50 so as to reduce the sliding friction. In an embodiment, the lubricating layer 46 and the rollers 47 can be used concurrently. However, in another embodiment, the lubricating layer 46 and the rollers 47 can be used separately, and the present invention is not limited thereto.

Figure 14:
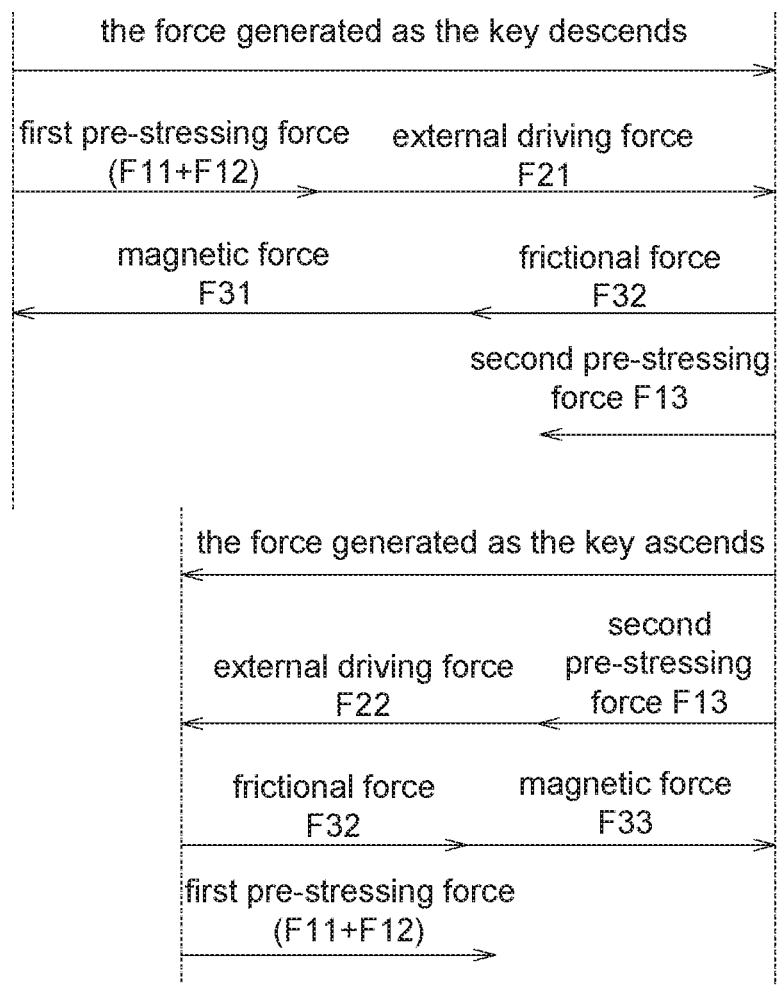
FIG. 14 is a schematic diagram of force balance during the movement of a key according to an embodiment of the invention.

Refer to FIGS. 11A, 11B and 14. When the key structure 2C descends and is converted to the storing state from the releasing state, for the base board 50 to be moved, the first pre-stressing force (F11+F12) generated by the first elastic part 71 and the external driving force F21 need to be larger than the sum of the magnetic force F31 between the magnetic element 26 and the attractable element 25, the frictional force F32 between the base board 50 and the supporting board 40, and the second pre-stressing force F13. At the initial stage of movement, the second pre-stressing force is very small and can be neglected. Meanwhile, the first pre-stressing force (F11+F12) diminishes as the stretched distance of the first elastic part 71 decreases. Conversely, the second pre-stressing force F13 grows as the stretched distance of the second elastic part 72 increases. Since the second pre-stressing force F13 is still smaller than the magnetic force F33 between the magnetic element 26 and the second end 252 of the attractable element 25, the base board 50 will not be pulled back by the second pre-stressing force F13. Moreover, when the key structure 2C ascends and is converted to the releasing state from the storing state, for the base board 50 to be moved back, the second pre-stressing force F13 generated by the second elastic part 72 and the external driving force F22 need to be larger than the sum of the magnetic force F33 between the magnetic element 26 and the attractable element 25, the frictional force F32 between the base board 50 and the supporting board 40, and the first pre-stressing force (F11+F12). At the initial stage of movement, the first pre-stressing force is very small and can be neglected. Meanwhile, the second pre-stressing force F13 diminishes as the stretched distance of the second elastic part 72 decreases. Conversely, the first pre-stressing force (F11+F12) grows as the stretched distance of the first elastic part 71 increases. Since the first pre-stressing force (F11+F12) is still smaller than the magnetic force F31 between the magnetic element 26 and the first end 251 of the attractable element 25, the base board 50 will not be pulled back by the first pre-stressing force (F11+F12).

While the invention has been described by way of example and in terms of the preferred embodiment(s), it is to the underneath of stood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key structure, comprising:
   a supporting board;
   a base board overlapping the supporting board, wherein the base board or the supporting board is a sliding board, so that the base board and the supporting board can slide with respect to each other;
   a pre-stressing force applying assembly comprising at least one first elastic part and at least one second elastic part respectively connected to two opposite sides of the supporting board or the base board being the sliding board;
   a key cap;
   a pivot assembly interposed between the key cap and the supporting board;
   an attractable element disposed under the pivot assembly, wherein the attractable element has a first end and a second end, which are rotated around a first axis and alternatively moved to a first attractive position and a second attractive position; and
   a magnetic element disposed on the base board, wherein the magnetic element provides a magnetic force and is movable between the first attractive position and the second attractive position through the sliding of the base board or the supporting board, when the magnetic element is under the first attractive position, the first end of the attractable element is attracted by the magnetic force and moved to the first attractive position, and the at least one first elastic part generates a first pre-stressing force; when the magnetic element is under the second attractive position, the second end of the attractable element is attracted by the magnetic force and moved to the second attractive position, and the at least one second elastic part generates a second pre-stressing force, wherein the first pre-stressing force or the second pre-stressing force reduces the resistance during the sliding of the base board or the supporting board.

2. The key structure according to claim 1, wherein the second pre-stressing force is smaller than the first pre-stressing force.

3. The key structure according to claim 2, wherein when the magnetic element is under the first attractive position, the key cap ascends to a higher position with respect to the supporting board; when the magnetic element is under the second attractive position, the key cap descends to a lower position with respect to the supporting board.

4. The key structure according to claim 3, wherein
   the at least one first elastic part disposed on a first side of the base board or the supporting board being the sliding board, wherein when the magnetic element is under the first attractive position, the at least one first elastic part is stretched by a first distance to generate the first pre-stressing force, the magnetic element is moved to the second attractive position from the first attractive position, and the first pre-stressing force diminishes as the first distance decreases; and
   the at least one second elastic part disposed on a second side of the base board or the supporting board being the sliding board, wherein the base board or the supporting board is slidable, the first side and the second side are disposed oppositely, and when the magnetic element is under the second attractive position, the at least one second elastic part is stretched by a second distance to generate the second pre-stressing force, the magnetic element is moved to the first attractive position from the second attractive position, and the second pre-stressing force diminishes as the second distance decreases.

5. The key structure according to claim 3, wherein
   the at least one first elastic part connected between the base board and the supporting board, wherein when the magnetic element is under the first attractive position, the at least one first elastic part is stretched by a first distance to generate the first pre-stressing force, the magnetic element is moved to the second attractive position from the first attractive position, and the first pre-stressing force diminishes as the first distance decreases; and
   the at least one second elastic part connected between the base board and the supporting board, wherein the first side and the second side are disposed oppositely, and when the magnetic element is under the second attractive position, the at least one second elastic part is stretched by a second distance to generate the second pre-stressing force, the magnetic element is moved to the first attractive position from the second attractive position, and the second pre-stressing force diminishes as the second distance decreases.

6. The key structure according to claim 4, wherein the at least one first elastic part and the at least one second elastic part are tension springs, and a coefficient of elasticity of the at least one first elastic part is larger than or equivalent to a coefficient of elasticity of the at least one second elastic part.

7. The key structure according to claim 5, wherein the at least one first elastic part and the at least one second elastic part are tension springs, and a coefficient of elasticity of the at least one first elastic part is larger than or equivalent to a coefficient of elasticity of the at least one second elastic part.

8. The key structure according to claim 4, wherein the quantity of at least one first elastic part and the quantity of at least one second elastic part respectively are N and M being positive integers larger than 1, the first elastic parts are connected in parallel to generate the first pre-stressing force, and the second elastic parts are connected in parallel to generate the second pre-stressing force.

9. The key structure according to claim 5, wherein the quantity of at least one first elastic part and the quantity of at least one second elastic part respectively are N and M being positive integers larger than 1, the first elastic parts are connected in parallel to generate the first pre-stressing force, and the second elastic parts are connected in parallel to generate the second pre-stressing force.

10. The key structure according to claim 1, wherein the pivot assembly comprises:
a first pivot part whose one end has a first link bar and another end has a first fixing portion and a first shaft, wherein the first shaft has a first connecting portion; and
a second pivot part whose one end has a second link bar and another end has a second fixing portion and a second shaft, wherein the second shaft has a second connecting portion.

11. The key structure according to claim 10, wherein the first pivot part or the second pivot part has a stopping portion correspondingly located above the second attractive position, and when the magnetic element is moved to the second attractive position to attract the second end of the attractable element, the stopping portion contacts the second attractive position.

12. The key structure according to claim 10, wherein the supporting board comprises:
a first supporting part and a second supporting part coupled to two ends of the first fixing portion and two ends of the second fixing portion, respectively.

13. The key structure according to claim 12, wherein the first supporting part and the second supporting part are disposed oppositely and erected on a supporting side of the supporting board, the first supporting part comprises two first pivot holes, the second supporting part comprises two second pivot holes, and the two first pivot holes are opposite to the two second pivot holes for receiving the two ends of the first fixing portion and two ends of the second fixing portion.

14. The key structure according to claim 1, wherein the base board has a receiving space for receiving the magnet, the supporting board has a first opening, the first opening and the receiving space are correspondingly under the attractable element, the size of the first opening is larger than the size of the receiving space, the first opening provides an operation space allowing the magnet to be moved to the underneath of the second attractive position from the underneath of the first attractive position, and the receiving space is for fixing the magnet on the base board.

15. The key structure according to claim 14, wherein the receiving space is formed of a second opening passing through the base board or a recess not passing through the base board.

16. The key structure according to claim 14, wherein the base board comprises at least one stopping part which is moved to a stopping position of the key cap, and when the magnet is moved to the underneath of the second attractive position to attract the second end of the attractable element, the stopping part contacts the key cap, so that the key cap remains at the stopping position.

17. The key structure according to claim 1, further comprising a lubricating layer disposed between the supporting board and the base board.

18. The key structure according to claim 1, further comprising a plurality of rollers disposed between the supporting board and the base board.

19. A portable computer, comprising an upper cover, a lower cover and a connecting part connecting the upper cover to the lower cover, wherein the connecting part drives the base board or the supporting board of the key structure according to claim 1 to slide, and the first pre-stressing force or the second pre-stressing force reduces the resistance during the sliding of the base board or the supporting board.

* * * * *